US012248385B2

(12) United States Patent
Fujita (10) Patent No.: US 12,248,385 B2
(45) Date of Patent: Mar. 11, 2025

(54) INFORMATION PROCESSING DEVICE AND RECOVERY METHOD THEREFOR (71) Applicant: NEC Platforms, Ltd., Kawasaki (JP)

(72) Inventor: Yuji Fujita, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 71 days.

(21) Appl. No.: 18/100,957

(22) Filed: Jan. 24, 2023

(65) Prior Publication Data

US 2023/0251947 A1 Aug. 10, 2023

(30) Foreign Application Priority Data

Feb. 8, 2022 (JP) .................................. 2022-017878

(51) Int. Cl.
G06F 11/30 (2006.01)
G06F 11/14 (2006.01)
G06F 13/40 (2006.01)

(52) U.S. Cl.
CPC ...... G06F 11/3051 (2013.01); G06F 11/1441 (2013.01); G06F 13/4063 (2013.01)

(58) Field of Classification Search
CPC .................................................. H04L 63/0227
See application file for complete search history.

(56) References Cited

U.S. PATENT DOCUMENTS 8,375,244 B2 * 2/2013 Bobak ................. H04L 41/0654
709/224
2005/0177760 A1 8/2005 Oohira
2007/0204092 A1 8/2007 Hirata
2014/0297999 A1 10/2014 Kim et al.
2016/0210163 A1 7/2016 McSorely
2021/0111942 A1 * 4/2021 Tahhan .................. H04L 43/20

FOREIGN PATENT DOCUMENTS

| JP | 2005-215809 A | 8/2005 |
| JP | 2007-226653 A | 9/2007 |
| JP | 2009-116642 A | 5/2009 |
| JP | 2011-128795 A | 6/2011 |

OTHER PUBLICATIONS

Japanese Ofice Action for JP Application No. 2022-017878, mailed on Mar. 22, 2023 with English Translation.

* cited by examiner

Primary Examiner — Henry Tsai
Assistant Examiner — Juanito C Borromeo (57) ABSTRACT An information processing device includes a computer system and a dedicated device connected via a dedicated bus, wherein the computer system implements a monitoring unit via an operating system thereof. The monitoring unit includes a detection module configured to detect the blocked state of the dedicated bus, and a blocking release module activated upon detecting the blocked state of the dedicated bus and configured to perform a blocking release process for instructing the operating system to disconnect the dedicated device, for releasing the blocked state of the dedicated bus, for instructing the operating system to reset the dedicated device disconnected from the computer system, and for instructing the operating system to reconnect the dedicated device to the computer system after resetting the dedicated device.

5 Claims, 6 Drawing Sheets

INFORMATION PROCESSING DEVICE AND RECOVERY METHOD THEREFOR

CROSS-REFERENCE TO RELATED APPLICATION

The present application claims the priority benefit of Japanese Patent Application No. 2022-17878 filed on Feb. 8, 2022, the subject matter of which is hereby incorporated herein by reference.

BACKGROUND OF THE INVENTION

1. Field of the Invention

The present invention relates to an information processing device including a computer system connected with a dedicated device via a dedicated bus and a recovery method for recovering a failure of the dedicated bus.

2. Description of Related Art

Any computer system using a PCI bus (where "PCI" stands for Peripheral Component Interconnect) needs to block the PCI bus due to its failure. Blocking the PCI bus may incapacitate the computer system from using a PCI device connected with the PCI bus. Most of PCI-bus failures would be considered as intermittent failures, which can be resolved by recovering the blocked state of PCI buses, thus recapacitating the computer system to reuse PCI devices. For example, Patent Document 1 (i.e., Japanese Patent Application Publication No. 2009-116642) relates to a recovery technique for recovering a PCI-bus failure by BIOS (Basic Input/Output System) using a hot-plug function for each PCI card adopting OS (Operating System). Specifically, Patent Document 1 discloses a PCI-bus-failure recovery method for detecting the blocked state of a PCI bus, disconnecting a PCI card connected to the PCI bus in its downstream side, diagnosing whether the PCI bus can operate normally, and releasing the blocked state of the PCI bus if operated normally.

Although the technology of Patent Document needs elaboration on BIOS, it is difficult for computer systems such as general-purpose servers to modify their BIOS.

In addition, Patent Document 2 (i.e., Japanese Patent Application Publication No. 2011-128795) discloses an information processing device configured to automatically reincorporate a PCI device into an operating system (OS) in a recovery process using an alternative device even in an interrupt-masking condition. Specifically, the information processing device is configured to duplex paths for a PCI-recovery process responsive to a failure of a PCI bus via a first recovery path derived from the OS constructed as a platform and a second recovery path derived from BMC (Baseboard Management Controller) constructed as a platform. However, it is complicated to provide duplex recovery paths in association with a PCI bus connected with a PCI device.

The present invention aims to provide an information processing device and a recovery method which can solve the aforementioned problem.

SUMMARY OF THE INVENTION

In a first aspect of the present invention, an information processing device includes a computer system and a dedicated device connected to the computer system via a dedicated bus, wherein the computer system implements a monitoring system via an operating system thereof. The monitoring unit further includes a detection module configured to detect the blocked state of the dedicated bus and a blocking release module activated upon detecting the blocked state of the dedicated bus and configured to perform a blocking release process for instructing the operating system to disconnect the dedicated device, for releasing the blocked state of the dedicated bus, for instructing the operating system to reset the dedicated device disconnected from the computer system, and for instructing the operating system to reconnect the dedicated device to the computer system after resetting the dedicated device.

In a second aspect of the present invention, a recovery method is configured to recovery a failure of a dedicated bus connected between a computer system and a dedicated device in an information processing device, wherein the computer system implements a monitoring unit via an operating system. The monitoring unit is configured to detect the blocked state of the dedicated bus connected between the computer system and the dedicated device, and upon detecting the blocked state of the dedicated bus, configured to instruct the operating system to disconnect the dedicated device, to release the blocked state of the dedicated bus, to instruct the operating system to reset the dedicated device after disconnected from the computer system, and to instruct the operating system to reconnect the dedicated device after resetting the dedicated device.

In a third aspect of the present invention, a non-transitory computer-readable storage medium is configured to store a program causing an information processing device including a computer system and a dedicated device connected via a dedicated bus to implement a monitoring unit via an operating system, thus implementing: detecting the blocked state of the dedicated bus connected between the computer system and the dedicated device, and upon detecting the blocked state of the dedicated bus, instructing the operating system to disconnect the dedicated device, releasing the blocked state of the dedicated bus, instructing the operating system to reset the dedicated device after disconnected from the computer system, and instructing the operating system to reconnect the dedicated device after resetting the dedicated device.

According to the present invention, it is possible to recover a failure of an information processing device in the blocked state of a dedicated bus connected between a general-purpose computer system and a dedicated device.

DETAILED DESCRIPTION OF THE
EXEMPLARY EMBODIMENTS

The present invention will be described in detail by way of examples and embodiments, which are exemplary and not restrictive; hence, the scope of the invention sought for protection should not be interpreted according to exemplary embodiments.

Figure 1:
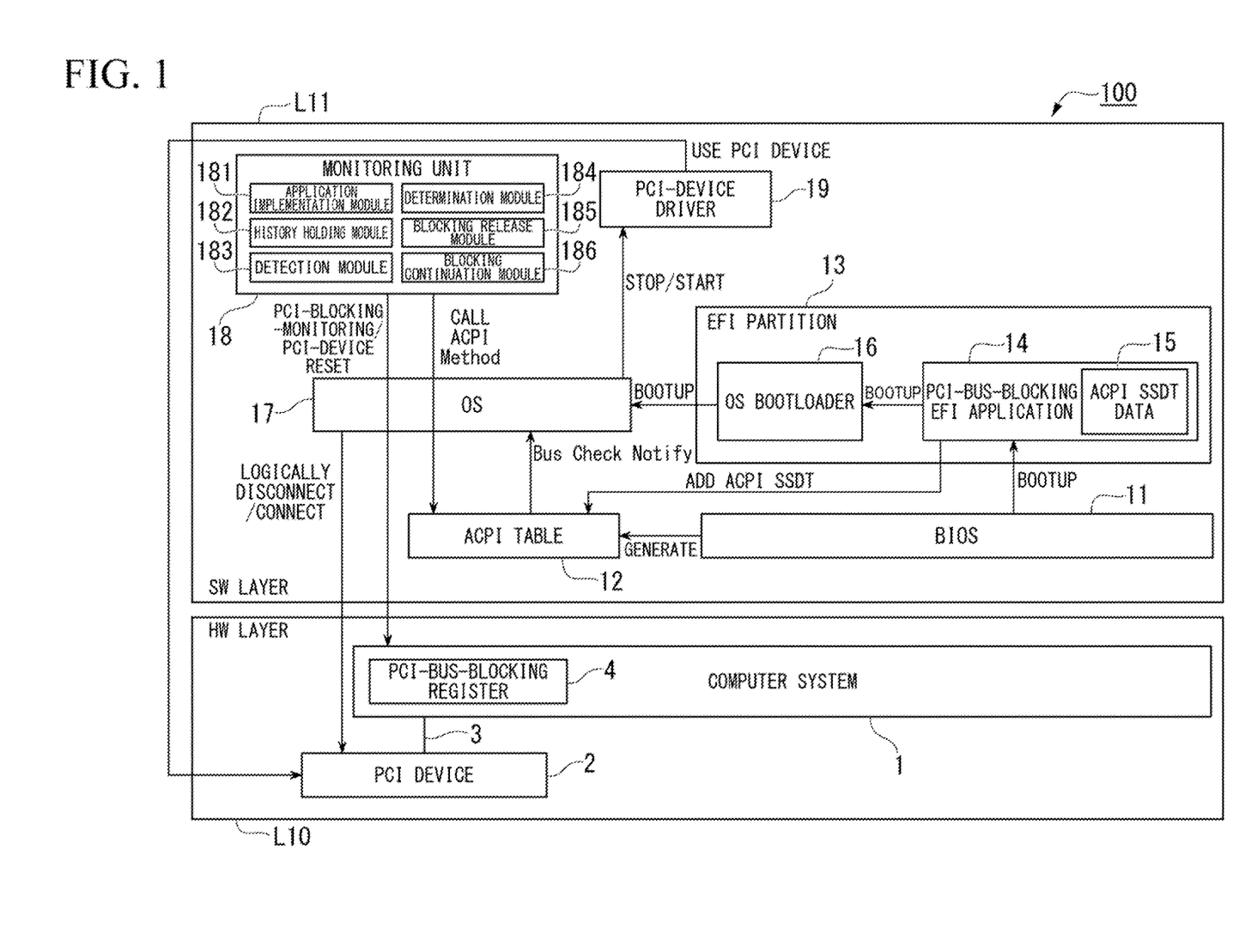
FIG. 1 is a block diagram showing the configuration of an information processing device including a hardware layer and a software layer according to an exemplary embodiment of the present invention.

FIG. 1 is a block diagram showing the configuration of an information processing device according to the exemplary embodiment of the present invention. FIG. 1 shows physical and functional blocks (e.g., hardware and software blocks) extracted from to an information processing device 100 for the purpose of explaining the configuration thereof according to the exemplary embodiment of the present invention.

FIG. 1 depicts arrows between blocks, which do not necessarily mean unilateral associations between blocks but may include bilateral associations between blocks as necessary. The information processing device 100 such as a server computer includes a hardware (HW) layer L10 and a software (SW) layer L11.

The hardware layer L10 shows the hardware configuration of the information processing device 100 while the software layer L11 shows the software-related functional configuration of the information processing device 100.

The hardware layer L10 includes a computer system 1, a PCI device 2, and a PCI bus 3. The computer system 1 is connected to the PCI device 2 via the PCI bus 3. The computer system 1 includes a processor and memory (or various types of memory devices). The computer system 1 includes a PCI-bus-blocking register 4, e.g., a register configured to store a value of a PCI-bus-blocking flag. In the present exemplary embodiment, the PCI-bus-blocking flag indicates the unblocked state of the PCI bus 3, wherein a value "1" set to the PCI-bus-blocking flag indicates that the PCI bus 3 is not blocked.

The software layer L11 is realized by the computer system 1 executing programs; hence, FIG. 1 shows various functions to be realized by the software layer L11 and various data used for those functions. Specifically, the software layer L11 includes a BIOS (Basic Input/Output System) 11, an ACPI (Advanced Configuration and Power Interface) table 12, an EFI (Extensible Firmware Interface) partition 13, an OS (Operating System) 17, a monitoring unit 18, and a PCI-device driver 19.

The BIOS 11 is realized by the computer system 1 executing BIOS programs defined by the UEFI specification, wherein "UEFI" stands for Unified Extensible Firmware Interface, i.e., a software interface between an operating system and a platform firmware. As the BIOS 11, it is possible to use any type of BIOS mounted on general-purpose servers or the like. The ACPI table 12 includes various data according to data configurations defined according to the ACPI specification. The ACPI table 12 is created by the BIOS 11 at a bootup of the computer system 1. The ACPI table 12 is configured to store various data needed for system initialization. The OS 17 may refer to the ACPI table 12.

The EFI partition 13 is a storage area accessible by the BIOS 11 and the OS 17. In general, the EFI partition 13 deploys an OS bootloader 16. In addition, the EFI partition 13 deploys a PCI-bus-blocking EFI application 14 and an ACPI SSDT DATA 15 (where "SSDT" stands for Secondary System Descriptor Table). Hereinafter, the PCI-bus-blocking EFI application 14 will be simply referred to as "EFI APP 14".

The EFI APP 14 is an EFT application operating on the BIOS 11. The EFI application is an application operating on the BIOS defined by the UEFI specification. The EFI APP 14 includes the ACPI SSDT DATA 15. The EFI APP 14 instructs the BIOS 11 to add the ACPI SSDT DATA 15 to the ACPI table 12 at a bootup of the BIOS 11. Specifically, the EFI APP 14 is configured to add the ACPI SSDT DATA 15 to the ACPI table 12 using an API (Application Program Interface) which is prepared according to the UEFI specification. After adding the ACPI SSDT DATA 15 to the ACPI table 12, the EFI APP 14 boots up the OS bootloader 16. In this connection, it is possible to store the ACPI SSDT DATA 15 in an external device rather than the EFI APP 14 if the EFI APP 14 can load the ACPI SSDT DATA 15 from an external device.

The ACPI SSDT DATA 15 is a collection of data describing ACPI Method for issuing Bus Check Notify which is defined by the ACPI specification. Herein, Bus Check Notify is a notification for the OS 17 to reacknowledge the PCI device 2. When the OS 17 cannot find the PCI device 2 upon receiving Bus Check Notify, the OS 17 may stop the PCI-device driver 17, thus establishing a logically-disconnected state of the PCI device 2. Upon successfully finding the PCI device 2, the OS 17 starts the PCI-device driver 19 to establish a logically-connected state of the PCI device 2. This makes it possible for the OS 17 to use the PCI device 2. Using the function of Bus Check Notify, it is possible for the OS 17 to logically connect or disconnect the PCI device 2 to the computer system 1 without modifying a generally-known operating system.

The OS bootloader 16 is an EFI application for booting up the OS 17. The OS bootloader 16 operates on the BIOS 11.

For example, the OS 17 is a general operating system which can operate on a general-purpose server. The OS 17 is realized by the computer system 1 when its processor reads and executes an OS software from memory. For example, the processor is a CPU (Central Processing Unit). The OS 17 includes an interface defined by the UEFI specification and an interface defined by the ACPI specification.

The monitoring unit 18 is realized by the computer system 1 when its processor reads and executes monitoring software from memory. The monitoring software is software operating on the OS 17. The monitoring unit 18 includes an application (APP) implementing module 181, a history holding module 182, a detection module 183, a determination module 184, a blocking release module 185, and a blocking continuation module 186.

The application implementing module 181 is configured to execute a process for deploying the EFI APP 14 on the EFI partition 13, a process for registering the EFI APP 14 on BOOT Entry of the BIOS 11, and a process for rebooting the computer system 1.

The history holding module 182 is configured to store information about a failure history of the PCI bus 3. The detection module 183 is configured to monitor a PCI-bus-blocking flag stored in the PCI-bus-blocking register 4. The detection module 183 detects the blocked state of the PCI bus 3 according to a value of the PCI-bus-blocking flag. The detection module 183 writes the blocking history of the PCU bus 3 into the history holding module 182.

The determination module 184 performs a PCI-bus-blocking release determination process when the detection module 183 detects the blocked state of the PCI bus 3. In the PCI-bus-blocking release determination process, the determination module 184 acquires a blocking count representing the number of times the PCI bus 3 has been blocked with reference to the failure history information stored on the history holding module 182. When the blocking count is less than a predetermined number of times for blocking the PCI bus 3, the determination module 184 determines that the PCU bus 3 would be repeatedly blocked due to an intermittent failure. In this case, the blocking release module 185 performs a PCI-bus-blocking release process for releasing the blocked state of the PCI bus 3. When the blocking count is equal to or above the predetermined number of times, the determination module 184 determines that the PCI bus 3 would be repeatedly blocked due to a fixed failure. In this case, the blocking continuation module 186 performs a PCI-bus-blocking continuation process for continuing the blocked state of the PCI bus 3.

The PCI-device driver 19 is realized by the computer system 1 when its processor reads and executes a device driver from memory. The device driver is a program for the OS 17 to use the PCI device 2. The PCI-device driver 19 operates on the OS 17.

Next, the operation of the information processing device 100 will be described, in particular, with respect to a PCI-bus-blocking recovery process via two phases, i.e., a "preparation phase" and a "monitoring/recovery phase".

Figure 2:
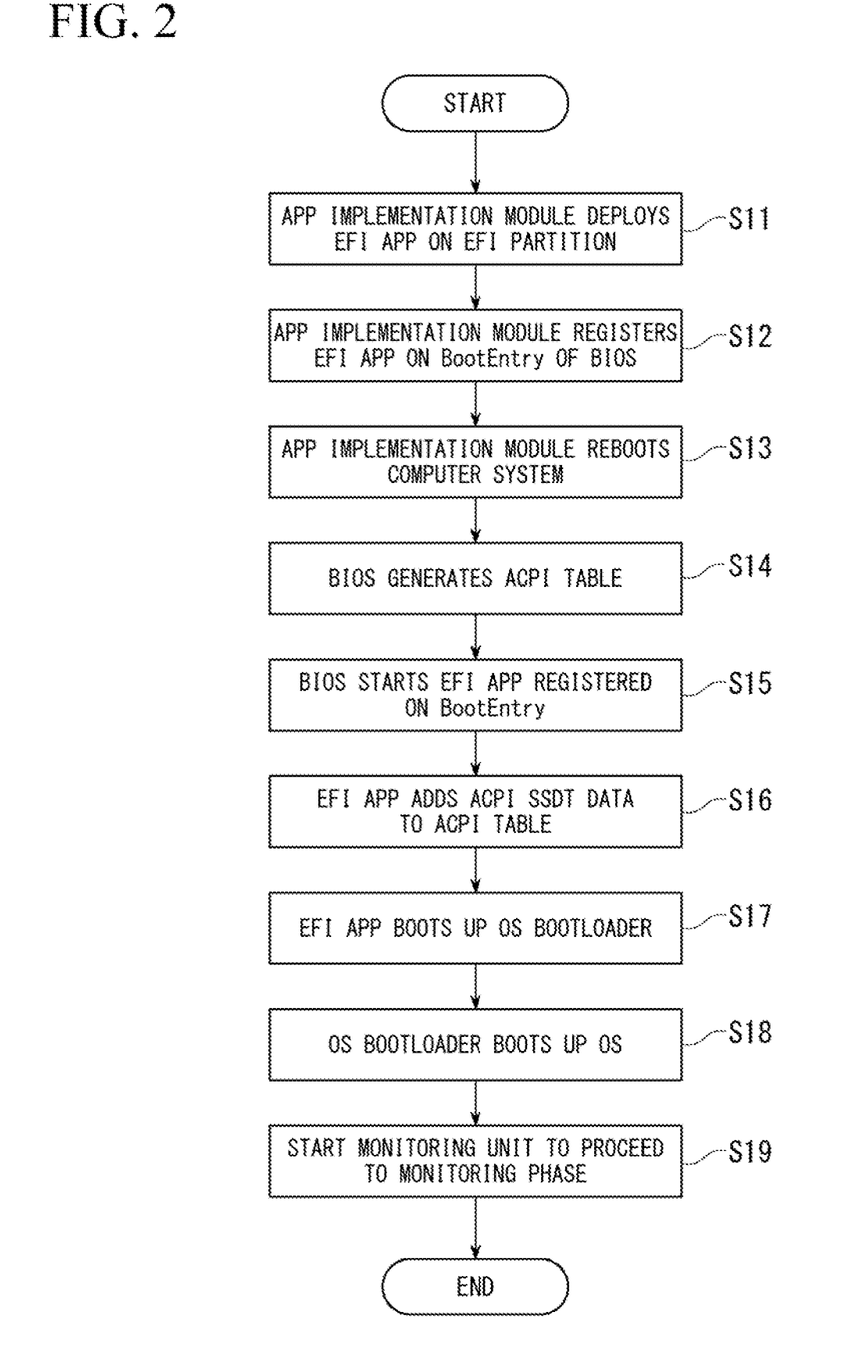
FIG. 2 is a flowchart showing the processing of the information processing device in a preparation phase according to the exemplary embodiment of the present invention.

FIG. 2 is a flowchart showing the processing of the information processing device 100 in a preparation phase. The preparation phase may begin in the bootup state of the OS 17 in the computer system 1. At first, the application implementation module 181 of the monitoring unit 18 deploys the EFI APP 14 on the EFI partition 13 (step S11). For example, the application implementation module 181 copies a program of the EFI APP 14 from the monitoring software or the storage location described in the monitoring software so as to write the program into the EFI partition 13. In addition, the application implementation module 181 registers the EFI APP 14 on Boot Entry of the BIOS 11 (step S12). Herein, Boot Entry is an entry for describing a program to be executed by the BIOS 11 after bootup. In general, the OS bootloader is designated on Boot Entry. After completion of bootup of the BIOS 11, the OS bootloader 16 is executed to boot up the OS 17.

The application implementation module 181 reboots the computer system 1 (step S13). Rebooting the computer system 1 may boot up the BIOS 11. During bootup, the BIOS 11 may generate the ACPI table 12 (step S14), and therefore the BIOS 11 writes the ACPI table 12 into memory of the computer system 1. After completion of bootup, the BIOS 11 boots up the EFI APP 14 registered on Boot Entry (step S15).

The EFI APP 14 adds the ACPI SSDT DATA 15 to the ACPI table 12 generated by the BIOS 11 (step S16). The EFI APP 14 performs an addition of the ACPI SSDT DATA 15 via an ACPI additional interface (EFT_ACPI_TABLE_PROTOCOL. InstallAcpiTable) defined by the UEFI specification. Normally, the BIOS 11 is solely allowed to generate or change the ACPI table 12. However, it is possible to add data to the ACPI table 12 using the ACPI additional interface which is a API (Application Program Interface) prepared as a standard installation.

Subsequently, the EFI APP 14 boots up the OS bootloader 16 (step S17). After completion of bootup, the OS bootloader 16 boots up the OS 17 (step S18). When booted up, the OS 17 can refer to the ACPI table 12 generated by the BIOS 11. After completion of bootup of the OS 17, the computer system 1 may execute the monitoring software operated on the OS 17, thus starting up the monitoring unit 18. After startup of the monitoring unit 18, the information processing device 100 will proceed with the monitoring phase (step S19).

Figure 3:
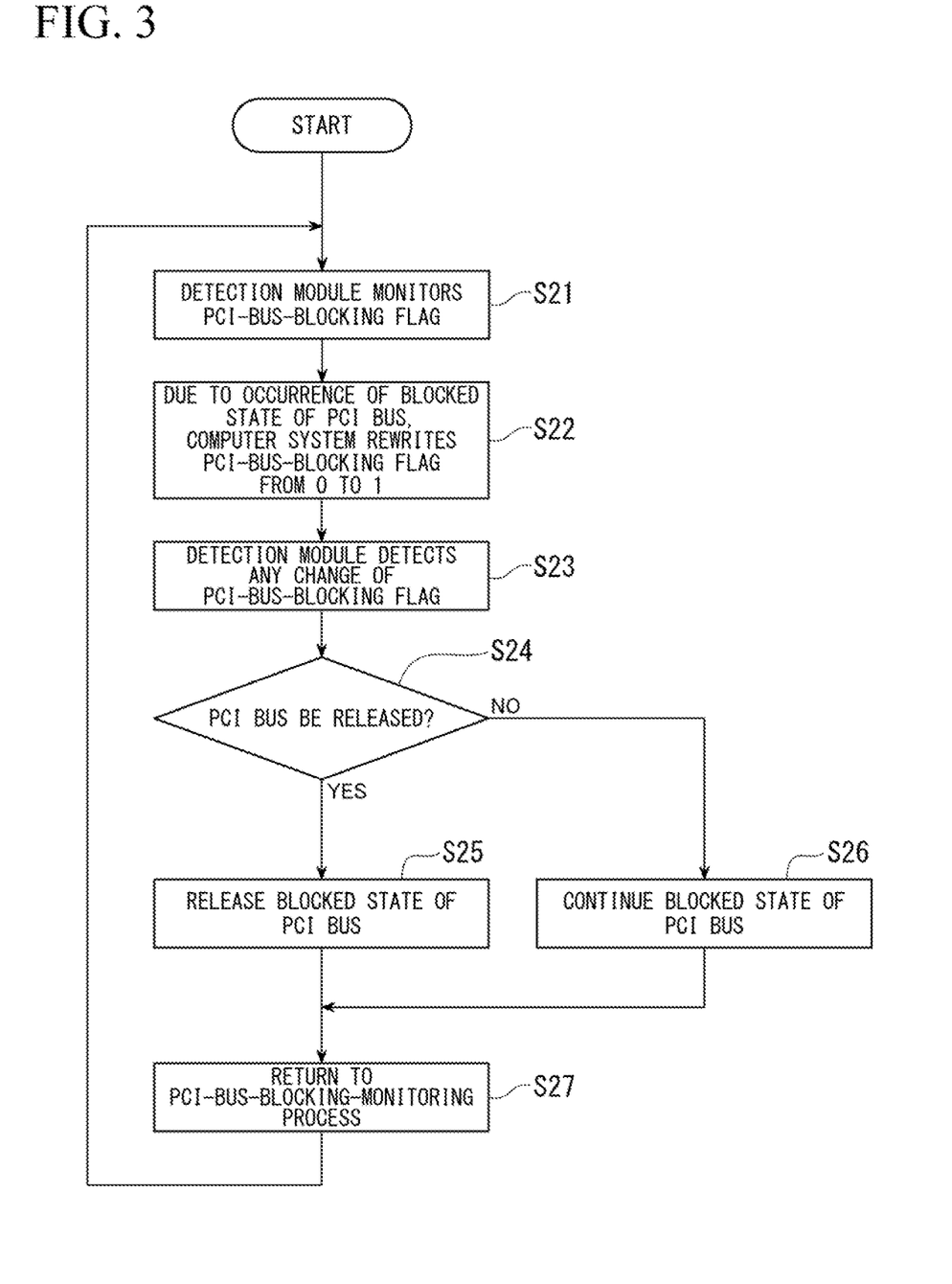
FIG. 3 is a flowchart showing the processing of the information processing device in a monitoring phase according to the exemplary embodiment of the present invention.

FIG. 3 is a flowchart showing the processing of the information processing device 100 in the monitoring phase. The detection module 183 of the monitoring unit 18 monitors a PCI-bus-blocking flag stored on the ACPI table 12 generated by the BIOS 11 (step S21). Due to the occurrence of a PCI-bus-blocking event, the computer system 1 changes the PCI-bus-blocking flag from "0" to "1" (step S22).

The detection module 183 detects that the PCI-bus-blocking flag has been changed from "0" to "1" (step S23). The determination module 184 determines whether or not to perform the PCI-bus-blocking release process (step S24). For this reason, the determination module 184 acquires from the failure information stored on the history holding module 182 the information (e.g., a blocking count) about the number of times the PCI bus 3 has been repeatedly blocked.

Figure 4:
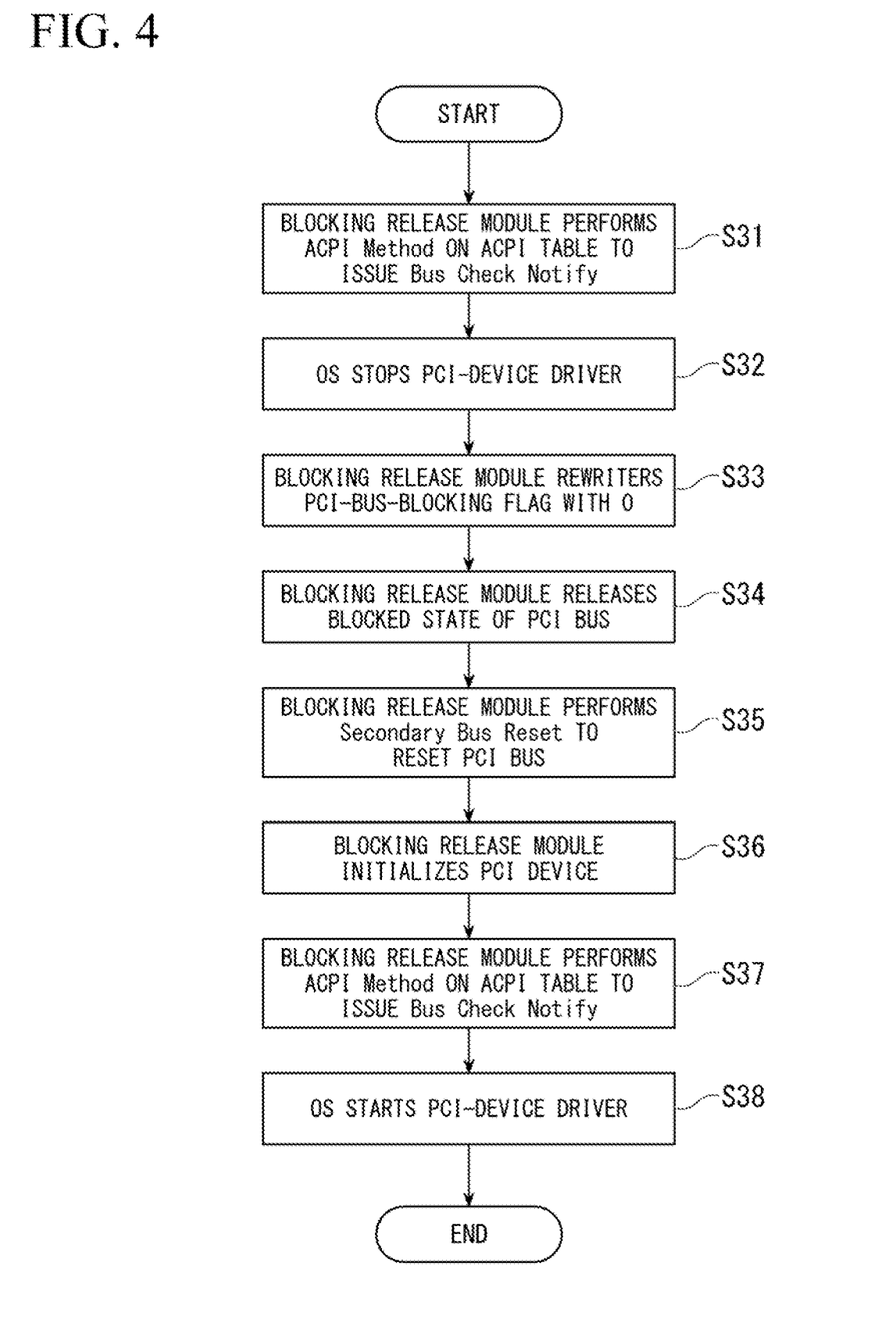
FIG. 4 is a flowchart showing a PCI-bus-blocking release process of the information processing device according to the exemplary embodiment of the present invention.
Figure 5:
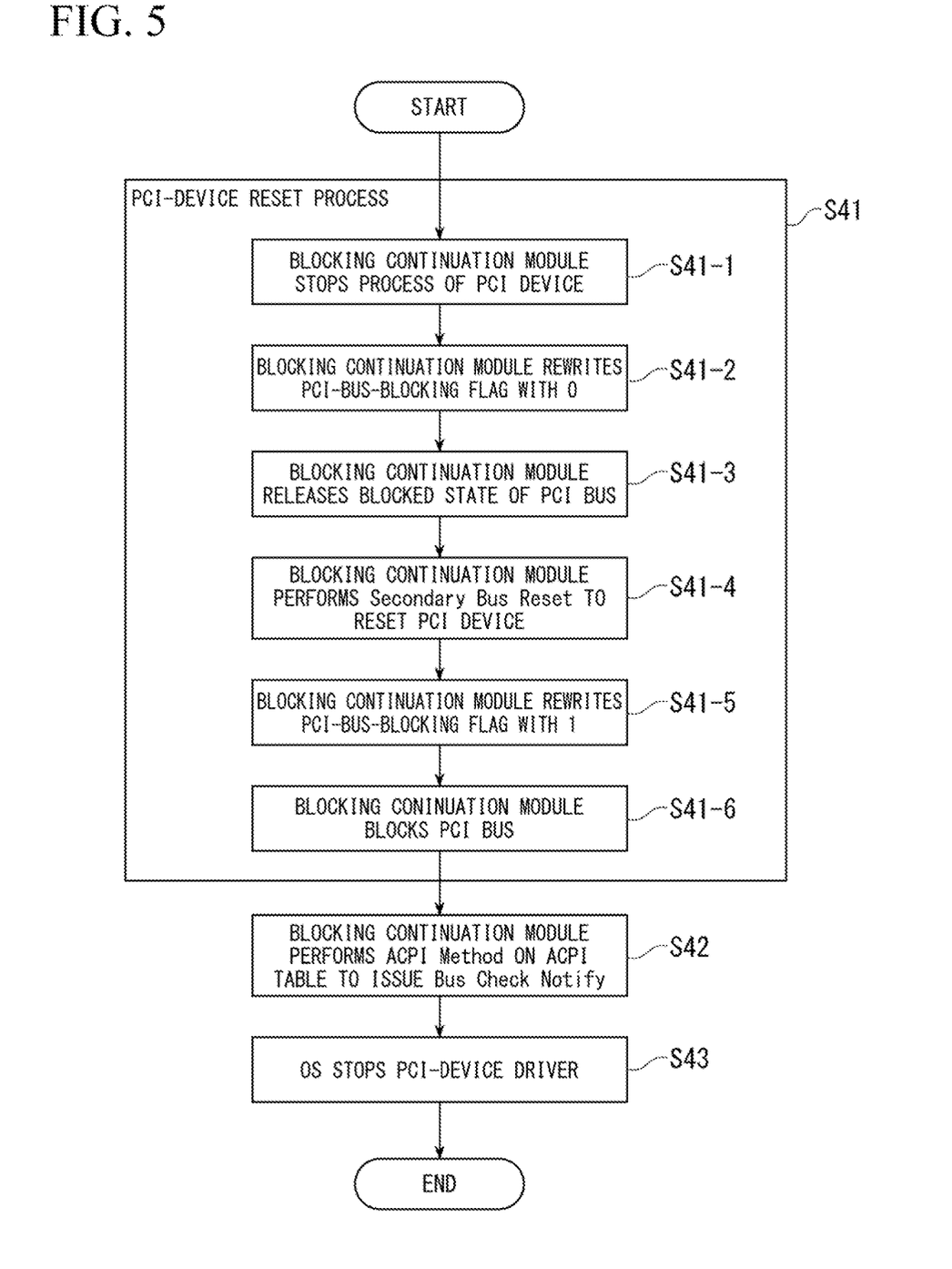
FIG. 5 is a flowchart showing a PCI-bus-blocking continuation process of the information processing device according to the exemplary embodiment of the present invention.

When the blocking count is less than the predetermined number of times for blocking the PCI bus 3, the determination module 184 determines to perform the PCI-bus-blocking release process (step S24, YES). The information processing device 100 performs the PCI-bus-blocking release process (as shown in FIG. 4 which will be described later) (step S25). When the blocking count is equal to or above the predetermined number of times for blocking the PCI bus 3, the determination module 184 determines not to perform the PCI-bus-blocking release process (step S24, NO). The information processing device 100 performs the PCI-bus-blocking continuation process (as shown in FIG. 5 which will be described later) (step S26). After completion of step S25 or step S26, the information processing device 100 reverts to the PCI-bus-blocking monitoring process of step S21 (step S27).

FIG. 4 is a flowchart showing the PCI-bus-blocking release process of the information processing device 100. FIG. 4 shows the details of step S25 of FIG. 3. The blocking release module 185 calls ACPI Method to perform Bus Check Notify registered on the ACPI table 12. Subsequently, Bus Check Notify is issued to the OS 17 (step S31). Upon receiving Bus Check Notify, the OS 17 proceeds to reacknowledgement of the PCI device 2. However, the OS 17 cannot find the PCI device 2 since the PCI bus 3 is blocked. Accordingly, the OS 17 should stop the PCI-device driver 19 (step S32). Stoppage of the PCI-device driver 19 may cause the PCI device 2 to be logically disconnected from the computer system 1.

The blocking release module 185 rewrites the PCI-bus-blocking flag with "0" (step S33). In addition, the blocking release module 185 performs the PCI-bus-blocking release process to release the blocked state of the PCI bus 3 currently being blocked (step S34). This makes it possible for the computer system 1 to control the PCI device 2. The blocking release module 185 performs Secondary Bus Reset to the PCI device 2 in its hardware (step S35). The function of Secondary Bus Reset is mounted on the computer system 1. The blocking release module 185 performs an initialization process of the PCI device 2 after resetting (step S36).

Subsequently, the blocking release module 185 calls ACPI Method to perform Bus Check Notify on the ACPI table 12, thus issuing Bus Check Notify to the OS 17 (step S37). After receiving Bus Check Notify, the OS 17 proceeds to reacknowledgement of the PCI device 2. Upon finding the PCI device 2, the OS 17 starts the PCI-device driver 19 so as to establish the logically-connected state of the PCI device 2 (step S38). Upon starting the PCI-device driver 19, it is possible for the computer system 1 to use the PCI device 2. Thereafter, the information processing device 100 proceeds to step S27 and then reverts to step S21.

FIG. 5 is a flowchart showing the PCI-bus-blocking continuation process of the information processing device 100. FIG. 5 shows the details of step S36 of FIG. 3. The blocking continuation module 186 of the monitoring unit 18 performs a PCI-device-reset process in step S41 ranging from step S41-1 to step S41-6 (step S41). In the PCI-bus-reset process, the blocking continuation module 186 stops the process to be performed from the computer system 1 to the PCI device 2 (step S41-1). Specifically, the blocking continuation module 186 performs Bus Master Disable to stop the read/write process of the PCI device 2 in hardware. The function of Bus Master Disable is mounted on the computer system 1.

Subsequently, the blocking continuation module 186 rewires the PCI-bus-blocking flag with "0" (step S41-2). The blocking continuation module 186 performs a PCI-bus-blocking release process to release the blocked state of the PCI bus 3 currently being blocked (step S41-3). This makes it possible for the computer system 1 to output a control signal to the PCI bus 2. The blocking continuation module 186 performs Secondary Bus Rest to reset the PCI device 2 in its hardware (step S41-4). After completion of resetting the PCI device 2, the monitoring unit 18 rewrites the PCI-bus-blocking flag with "1" (step S41-5). The monitoring unit 18 blocks the PCI bus 3 (step S41-6).

After completion of the PCI-device-reset process of step S41, the blocking continuation module 186 calls ACPI Method to perform Bus Check Notify registered on the ACPI table 12, thus issuing Bus Check Notify to the OS 17 (step S42). Upon receiving Bus Check Notify, the OS 17 proceeds to reacknowledgement of the PCI device 2. However, the OS 17 cannot find the PCI-device driver 19 due to the blocked sate of the PCI bus 3; hence, the OS 17 will stop the PCI-device driver 19 (step S43), thus leaving the PCI device 2 to be logically disconnected from the computer system 1. The information processing device 100 proceeds to step S27 of FIG. 3 and then reverts to step S21.

Generally speaking, computer systems using PCI buses are each designed to block a failed PCI bus making a PCI-bus failure. When the PCI-bus failure is an intermittent failure, for example, it is possible for a computer to use a PCI bus and its PCI device while being activated by recovering the PCI bus from its blocked state. However, it is difficult to modify general-purpose servers to be equipped with a PCI-bus recovery function.

Mainly, two objective problems may arise to realize PCI-bus-blocking recovery without modifying BIOS. A primary objective problem is to logically disconnect from OS a PCI device connected to the blocked PCI bus without using BIOS. Specifically, it is necessary to incorporate ACPI Method to issue Bus Check Notify onto an ACPI table (generated by BIOS) without modifying BIOS. A secondary objective problem is to turn down power of a PCI device without using BIOS.

According to the present exemplary embodiment, after bootup of the BIOS 11, the EFI APP 14 is configured to add to the ACPI table 12 the ACPI SSDT DATA 15 incorporating ACPI Method to issue Bus Check Notify. After addition of the ACPI SSDT DATA 15, the EFT APP 14 is configured to boot up the OS bootloader 16. The OS bootloader 16 boots up the OS 17 such that the OS 17 can refer to the ACPI table 12 set with the ACPI SSDT DATA 15. Subsequently, the monitoring unit 18 for monitoring software executed on the OS 17 calls ACPI Method on the ACPI table 12. Thus, it is possible to solve the primary objective problem without modifying BIOS.

According to the present exemplary embodiment, the monitoring unit 18 for monitoring software executed on the OS 17 is configured to perform a reset process of the PCI device 2. In the reset process, the monitoring unit 18 may perform Bus Master Disable (which is installed in the computer system 1 in advance) to stop the read/write process of the PCI device 2. Thereafter, the monitoring unit 18 releases the blocked state of the PCI bus 3 and then resets the PCI device 2 by performing Secondary Bus Reset (which is installed in the computer system 1 in advance). The monitoring unit 18 may block the PCI bus 3 again after resetting the PCI device 2. This may eliminate the necessity of turning down power of a PCI device via BIOS. Thus, it is possible to solve the secondary objective problem without modifying BIOS.

According to the present exemplary embodiment, it is possible for a computer system (such as a general-purpose server incapacitating any modification of BIOS) to realize the PCI-bus-blocking recovery. In addition, the present exemplary embodiment may eliminate the necessity of modifying OS.

Figure 6:
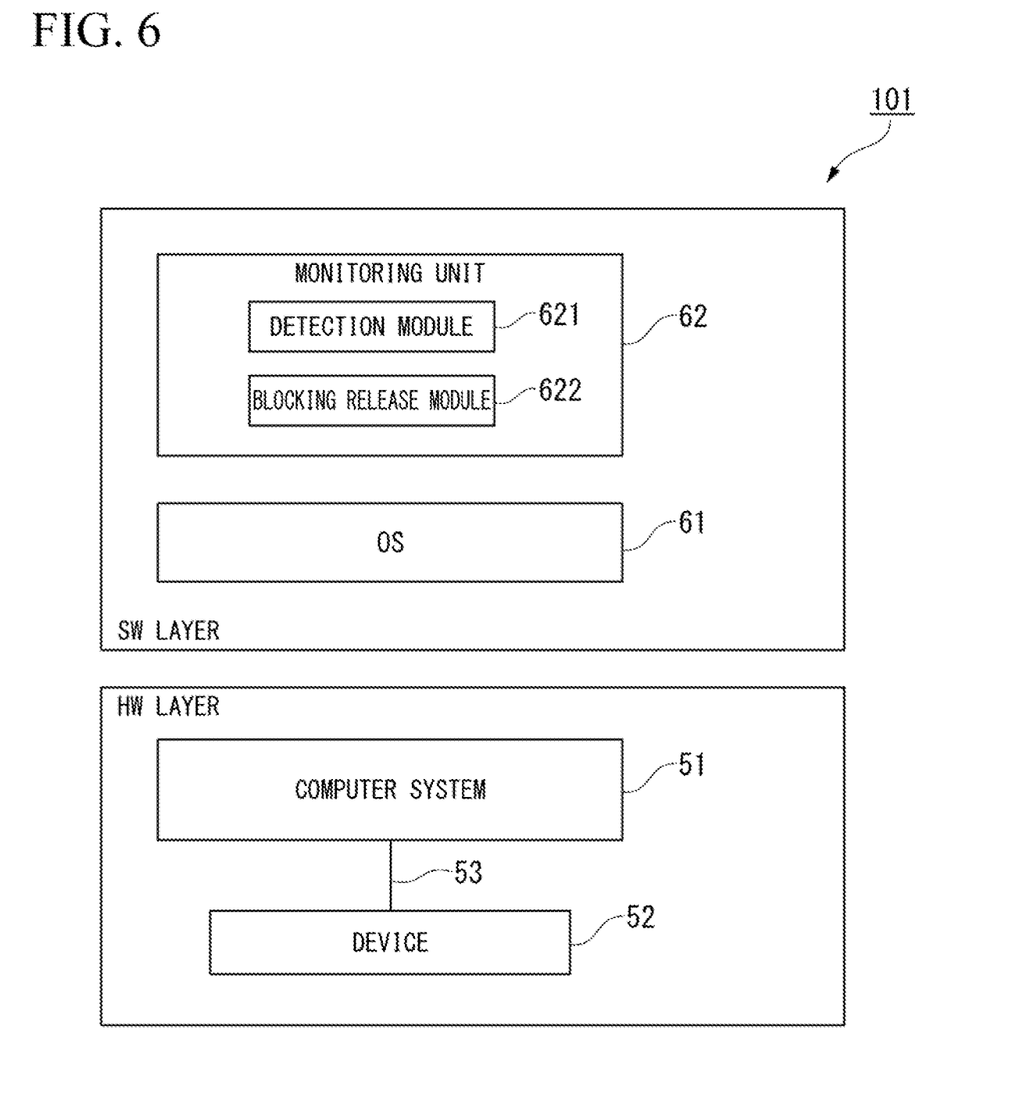
FIG. 6 is a block diagram showing the minimum configuration of the information processing device according to the exemplary embodiment of the present invention.

FIG. 6 is a block diagram showing the minimum configuration of an information processing device 101 according to the exemplary embodiment of the present invention. Similar to the information processing device 100, the information processing device 101 includes a hardware (HW) layer and a software (SW) layer. The hardware layer includes a computer system 51 and a device 52 which are connected by a bus 53. The software layer is realized using the hardware layer when the computer system 51 executes programs. The software layer includes an operating system (OS) 61 and a monitoring unit 62. The monitoring system 62 operates on the OS 61 to be executed by the computer system 51. The monitoring unit 62 includes a detection module 621 and a blocking release module 622. The detection module 621 is configured to detect the blocked state of the bus 53. The blocking release module 622 is configured to perform a blocking release process when the detection module 621 detects the blocked state of the bus 53. The blocking release process includes a process for instructing the OS 61 to disconnect the device 51, a process for releasing the blocked state of the bus 53, a process for the OS 61 (upon instructed) to reset the device 52 logically disconnected from the computer system 51, and a process for the OS 61 to reconnect the device 52 after its resetting. Similar to the information processing device 100, the information processing device 101 can recover the blocked state of the bus 53 connected between the computer system 51 and the device 52 without modifying BIOS.

A part of or the entirety of the foregoing exemplary embodiments can be defined by supplementary notes which are illustrative and not restrictive, as follows.

(Supplementary Note 1)

An information processing device includes a computer system and a dedicated device connected to the computer system via a dedicated bus. The computer system implements a monitoring unit via an operating system thereof, further including a detection module configured to detect the blocked state of the dedicated bus, and a blocking release module activated upon detecting the blocked state of the dedicated bus and configured to perform a blocking release process for instructing the operating system to disconnect the dedicated device, for releasing the blocked state of the dedicated bus, for instructing the operating system to reset the dedicated device disconnected from the computer system, and for instructing the operating system to reconnect the dedicated device to the computer system after resetting the dedicated device.

(Supplementary Note 2)

The information processing device according to Supplementary Note 1, wherein the monitoring unit includes a determination module activated upon detecting the blocked state of the dedicated bus and configured to determine whether to release or continue the blocked state of the dedicated bus according to a blocking count representing the number of times the dedicated bus be blocked, and a blocking continuation module activated upon determining to continue the blocked state of the dedicated bus and configured to perform a blocking continuation process for resetting the dedicated bus after releasing the blocked state of the dedicated bus, for blocking the dedicated bus after resetting the dedicated device, and for instructing the operating system to disconnect the dedicated device from the computer system after blocking the dedicated bus, wherein the blocking release process performs the blocking release process when the determination module determines to release the blocked state of the dedicated bus.

(Supplementary Note 3)

The information processing device according to Supplementary Note 2, wherein the computer system is configured to store an ACPI (Advanced Configuration and Power Interface) table describing a predetermined method for issuing an instruction for the operating system to connect or disconnect the dedicated device, wherein the blocking release process calls the predetermined method set to the ACPI table so as to instruct the operating system to disconnect the dedicated device and to reconnect the dedicated device after disconnected from the computer system, and wherein the blocking continuation module calls the predetermined method set to the ACPI table so as to instruct the operating system to disconnect the dedicated device.

(Supplementary Note 4)

The information processing device according to Supplementary Note 3, wherein the computer system includes a BIOS (Basic Input/Output System) to generate the ACPI table, into which the predetermined method is written via a writing means.

(Supplementary Note 5)

The information processing device according to Supplementary Note 5, further including an implementation means configured to implement the writing means with the information processing device.

(Supplementary Note 6)

The information processing device according to Supplementary Note 5, wherein the writing means is mounted on a EFI (Extensible Firmware Interface) partition of the computer system.

(Supplementary Note 7)

The information processing device according to any one of Supplementary Note 1 through Supplementary Note 5, further including a driver of the dedicated device, wherein the operating system stops the driver to logically disconnect the dedicated device while the operating system operates the driver to logically connect the dedicated device.

(Supplementary Note 8)

The information processing device according to Supplementary Note 2, wherein the blocking continuation module is configured to reset the dedicated device when the computer system stops a process of the dedicated device.

(Supplementary Note 9)

In the information processing device according to any one of Supplementary Note 3 through Supplementary Note 6, the predetermined method is configured to issue a notice for the operating system to reacknowledge the dedicated device, wherein upon receiving the notice, the operating system disconnects the dedicated device from the computer system when failing to acknowledge the dedicated device but the operating system connects the dedicated device to the computer system when successfully acknowledging the dedicated device.

(Supplementary Note 10)

The information processing device according to any one of Supplementary Note 4 through Supplementary Note 6, further comprising an operating-system bootup means for booting up the operating system, wherein the writing means activates the operating-system bootup means after writing the predetermined method into the ACPI table generated by the BIOS at bootup of the computer system.

(Supplementary Note 11)

In the information processing device according to Supplementary Note 1 through Supplementary Note 10, wherein the dedicated bus is a PCI (Peripheral Component Interconnect) bus.

(Supplementary Note 12)

The information processing device according to Supplementary Note 2, wherein the computer system is configured to write a value representing the blocked or unblocked state of the dedicated bus into a storage means, and wherein the determination module is configured to detect the blocked state of the dedicated bus with reference to the value stored on the storage means.

(Supplementary Note 13)

A recovery method for an information processing device including a computer system and a dedicated device connected to the computer system via a dedicated bus, wherein the computer system implements a monitoring unit via an operating system thereof. The recovery method causes the monitoring unit to detect the blocked state of the dedicated bus, and upon detecting the blocked state of the dedicated bus, to instruct the operating system to disconnect the dedicated device, to release the blocked state of the dedicated bus, to instruct the operating system to reset the dedicated device disconnected from the computer system, and to instruct the operating system to reconnect the dedicated device to the computer system after resetting the dedicated device.

(Supplementary Note 14)

A recovery method for an information processing device including a computer system and a dedicated device connected to the computer system via a dedicated bus, wherein the computer system implements a monitoring unit via an operating system thereof. The recovery method causes the monitoring unit to detect the blocked state of the dedicated bus, and upon detecting the blocked state of the dedicated bus, to instruct the operating system to disconnect the dedicated device, to release the blocked state of the dedicated bus, to disconnect the dedicated device from the computer system, to reset the dedicated device disconnected from the computer system, to instruct the operating system to reconnect the dedicated device after resetting the dedicated device, and to instruct the operating system to reconnect the dedicated device to the operating system.

(Supplementary Note 15)

A program causes a computer to execute the recovery method according to Supplementary Note 13.

Heretofore, the present invention has been described in detail by way of exemplary embodiments, which are illustrative and not restrictive. For example, the present invention is applicable to computer systems embracing dedicated devices and dedicated buses, which are not necessarily limited to PCI devices and PCI buses; in other words, it is possible to replace PCI devices and PCI buses with other types of dedicated devices and dedicated buses in connection with computer systems. That is, the present invention may allow for addition, omission, and replacement of constituent elements without departing from the essence of the invention that may fall within the scope of the invention as defined by the appended claims.

What is claimed is:

1. An information processing device comprising a computer system and a dedicated device connected to the computer system via a dedicated bus, the computer system comprising:
   at least one memory storing instructions; and
   at least one processor configured to execute the instructions to:
      detect a blocked state of the dedicated bus;
      upon detecting the blocked state of the dedicated bus, determine whether to release or continue the blocked state of the dedicated bus according to a blocking count representing a number of times the dedicated bus be blocked;
      upon determining to continue the blocked state of the dedicated bus, perform a blocking continuation process including:
         resetting the dedicated bus after releasing the blocked state of the dedicated bus;
         blocking the dedicated bus after resetting the dedicated device; and
         disconnecting the dedicated device from the computer system after blocking the dedicated bus;
      upon determining to release the blocked state of the dedicated bus, performing a blocking release process including:
         disconnecting the dedicated device;
         releasing the blocked state of the dedicated bus;
         resetting the dedicated device disconnected from the computer system, and
         reconnecting the dedicated device to the computer system after resetting the dedicated device,
   wherein the computer system is configured to store an Advanced Configuration and Power Interface (ACPI) table describing a predetermined method for issuing an instruction for the at least one processor to connect or disconnect the dedicated device,
   wherein the blocking release process calls the predetermined method set to the ACPI table so as to instruct the at least one processor to disconnect the dedicated device and to reconnect the dedicated device after disconnection from the computer system, and
   wherein the blocking continuation process calls the predetermined method set to the ACPI table so as to instruct the at least one processor to disconnect the dedicated device.

2. The information processing device according to claim 1, wherein the computer system includes a BIOS Basic Input/Output System (BIOS) configured to generate the ACPI table, into which the predetermined method is written by way of an Extensible Firmware Interface EFI) partition of the computer system.

3. The information processing device according to claim 1, further comprising a driver of the dedicated device,
   wherein the operating system stops the driver to logically disconnect the dedicated device while the operating system operates the driver to logically connect the dedicated device.

4. A recovery method for recovering a failure of a dedicated bus connected between a computer system and a dedicated device in an information processing device, the recovery method comprising:
   detecting a blocked state of the dedicated bus connected between the computer system and the dedicated device;
   upon detecting the blocked state of the dedicated bus, determining whether to release or continue the blocked state of the dedicated bus according to a blocking count representing a number of times the dedicated bus be blocked;
   upon determining to continue the blocked state of the dedicated bus, performing a blocking continuation process including:
      resetting the dedicated bus after releasing the blocked state of the dedicated bus;
      blocking the dedicated bus after resetting the dedicated device; and
      disconnecting the dedicated device from the computer system after blocking the dedicated bus;
   upon determining to release the blocked state of the dedicated bus, performing a blocking release process including:
      disconnecting the dedicated device;
      releasing the blocked state of the dedicated bus;
      resetting the dedicated device after disconnected from the computer system; and
      reconnecting the dedicated device after resetting the dedicated device,
   wherein the computer system is configured to store an Advanced Configuration and Power Interface (ACPI) table describing a predetermined method for issuing an instruction for an operating system of the computer system to connect or disconnect the dedicated device,
   wherein the blocking release process calls the predetermined method set to the ACPI table so as to instruct the operating system of the computer system to disconnect the dedicated device and to reconnect the dedicated device after disconnected from the computer system, and
   wherein the blocking continuation process calls the predetermined method set to the ACPI table so as to instruct the operating system of the computer system to disconnect the dedicated device.

5. A non-transitory computer-readable storage medium storing a program for causing an information processing device of a computer system including a dedicated device connected via a dedicated bus to execute:
   detecting a blocked state of the dedicated bus connected between the computer system and the dedicated device;
   upon detecting the blocked state of the dedicated bus, determining whether to release or continue the blocked state of the dedicated bus according to a blocking count representing a number of times the dedicated bus be blocked;
   upon determining to continue the blocked state of the dedicated bus, performing a blocking continuation process including:

resetting the dedicated bus after releasing the blocked state of the dedicated bus;

blocking the dedicated bus after resetting the dedicated device; and disconnecting the dedicated device from the computer system after blocking the dedicated bus;

upon determining to release the blocked state of the dedicated bus, performing a blocking release process including:

disconnecting the dedicated device;

releasing the blocked state of the dedicated bus;

resetting the dedicated device after disconnected from the computer system; and reconnecting the dedicated device after resetting the dedicated device, wherein the computer system is configured to store an Advanced Configuration and Power Interface (ACPI) table describing a predetermined method for issuing an instruction for an operating system of the computer system to connect or disconnect the dedicated device, wherein the blocking release process calls the predetermined method set to the ACPI table so as to instruct the operating system of the computer system to disconnect the dedicated device and to reconnect the dedicated device after disconnected from the computer system, and wherein the blocking continuation process calls the predetermined method set to the ACPI table so as to instruct the operating system of the computer system to disconnect the dedicated device.

* * * * *